UNITED STATES PATENT OFFICE.

CHARLES C. PARSONS AND EDWARD F. CRUSÉ, OF NEW YORK, N. Y., ASSIGNORS, BY DIRECT AND MESNE ASSIGNMENTS, TO HENRY BOWER, OF PHILADELPHIA, PENNSYLVANIA.

PROCESS OF OBTAINING CYANIDES.

SPECIFICATION forming part of Letters Patent No. 259,908, dated June 20, 1882.

Application filed October 7, 1879.

*To all whom it may concern:*

Be it known that we, CHARLES C. PARSONS and EDWARD F. CRUSÉ, both of the city, county, and State of New York, have jointly invented a certain new and useful Process for Obtaining Ferrocyanide of Iron and Ammonia from the Products of the Manufacture of Coal-Gas, of which process the following is a specification.

It has long been known in the art that cyanides are produced during the distillation of coal in the manufacture of gas, and are present in the ammoniacal liquor resulting from such distillation; and it is the object of our invention to afford means for extracting ferrocyanide of iron and ammonia from said ammoniacal liquor in an effective and economical manner.

To this end our invention consists in the addition of iron or a salt of iron to ammoniacal liquor, without, however, adding acids to said liquor, whereby a considerable portion of the cyanides are converted into ferrocyanide of ammonia in such form as to be susceptible of being thereafter utilized in the manufacture of ammonia and of ferrocyanide of iron (Prussian blue) by treatment with lime distillation and the addition of acid and a salt of iron, as hereinafter more fully set forth.

In the practice of our invention we submit the ammoniacal liquor as soon as practicable after its production to the action of iron in such form or combination as will convert the cyanide of ammonium existing in the liquor into ferrocyanide of ammonia, it being essential, furthermore, that no acid shall be added at this stage. When a soluble salt of iron is employed the amount of cyanide of ammonium present in the ammoniacal liquor should be ascertained by chemical test, and an amount of the salt of iron slightly in excess of that called for by equivalents should be thoroughly stirred in.

If the ammoniacal liquor is clear and free from tar, it may be filtered through a mass of iron borings or turnings, or of sulphide, carbonate, or oxide of iron, so arranged that the liquor may come in contact with an extended surface thereof. The action in this case will not be as rapid as when a soluble salt is used; but if the treatment is sufficiently thorough and protracted an equivalent result will be effected.

It is essential that the addition of the iron shall be made before the heating of the liquor for the extraction of the ammonia and before the addition of any acid thereto.

The cyanide of ammonium originally existing in the ammoniacal liquor having been converted, as before set forth, into ferrocyanide of ammonia, the succeeding treatment of the liquor for the extraction of the ammonia and ferrocyanide of iron is as follows: The liquor having been run into a still, lime is added in the usual proportions, which lime decomposes the ferrocyanide of ammonia, producing ferrocyanide of calcium and free ammonia. The latter is distilled off and utilized by any of the methods ordinarily practiced. The liquor, which now contains ferrocyanide of calcium in solution, is drawn from the still and allowed to stand until the suspended lime and other insoluble matters are deposited. The clear liquor is then drawn from the sediment, made slightly acid, and sulphate or other soluble salt of iron added as long as a precipitate is formed, by which the ferrocyanide of calcium is decomposed and ferrocyanide of iron (Prussian blue) precipitated therefrom.

By our hereinbefore-described process the cyanides are obtained from the liquor in such condition as to be readily made merchantable, while the ammonia may be distilled off and utilized in the ordinary manner. The proportions of salt of iron and of lime, respectively, which are to be added to the liquor need not be specified further than has been hereinbefore indicated, as these may be added in excess of the operative proportions without departing from the spirit of our invention.

It may be found advantageous to perform the first portion of the process at the gas-works, so as to have the ammoniacal liquor acted on by the iron before any decomposition of the cyanides takes place, as after they are converted into ferrocyanides they become permanent, and the further treatment of the liquor may be conducted at any convenient place and time.

We are aware that iron has heretofore been added to ammoniacal liquor in the presence of a free acid with the result of producing ferrocyanide of iron; but, as in precipitating the ferrocyanide will be mingled with the tar and other insoluble impurities of the liquor, the separation of the Prussian blue in marketable condition has been practically impossible; and, further, in the presence of free acid the ammonia could not be evolved by distillation.

We are also aware that lime has been used in treating the spent purifying matters of gas-works and in the ordinary distillation of ammonia from ammoniacal liquor. We do not therefore broadly claim either the addition of iron or of lime to ammoniacal liquor or other products of the manufacture of coal-gas.

We claim as our invention and desire to secure by Letters Patent—

1. The process of converting the cyanides of ammonium which are contained in ammoniacal gas-liquor into ferrocyanides of ammonia by adding iron in the form of a salt or in the insoluble form of hydrate, carbonate, oxide, or sulphide, or of metallic iron, and in the proportions above specified, to the said liquor in the absence of acid and without neutralizing the ammonia and before the ammonia is removed, substantially as specified.

2. The process herein described of treating gas-liquor for obtaining ammonia and Prussian blue by first adding iron in the form and proportions specified to said gas-liquor, thereby producing ferrocyanide of ammonia, then adding lime to free the ammonia and produce ferrocyanide of calcium, then distilling off the ammonia, and finally converting the ferrocyanide of calcium into Prussian blue by the addition of acid and a salt of iron, substantially as specified.

CHARLES C. PARSONS.
EDWARD F. CRUSÉ.

Witnesses:
WILLIAM J. PARSONS,
HIRAM SMITH.